United States Patent [19]

Elsner et al.

[11] Patent Number: 4,839,828

[45] Date of Patent: Jun. 13, 1989

[54] MEMORY READ/WRITE CONTROL SYSTEM FOR COLOR GRAPHIC DISPLAY

[75] Inventors: Matthew Elsner, Woodstock; Yoshio Iida, Lake Katrine; Edward Y. Kwong, West Hurley; Omar M. Rahim, Rhinebeck, all of N.Y.

[73] Assignee: International Business Machines Corporation, Armonk, N.Y.

[21] Appl. No.: 821,102

[22] Filed: Jan. 21, 1986

[51] Int. Cl.[4] .................................... G06F 3/15

[52] U.S. Cl. .................................... 364/518; 340/798; 340/800

[58] Field of Search ................ 364/518, 521; 340/747, 340/750, 798-801

[56] References Cited

U.S. PATENT DOCUMENTS

| | | | |
|---|---|---|---|
| 4,528,636 | 7/1985 | Robinson III | 340/799 X |
| 4,616,336 | 10/1986 | Robertson et al. | 364/521 |
| 4,648,045 | 3/1987 | Demetrescu | 364/518 |
| 4,682,297 | 7/1987 | Iwami | 364/521 |
| 4,688,033 | 8/1987 | Carini et al. | 340/799 X |
| 4,688,190 | 8/1987 | Bechtolsheim | 340/799 X |

*Primary Examiner*—Gary V. Harkcom
*Assistant Examiner*—H. R. Herndon
*Attorney, Agent, or Firm*—Mark S. Walker; J Dennis Moore

[57] ABSTRACT

A color graphic display having a read/write control system for a buffer memory therein. The invention provides Line-on-Line and Underpaint by way of a method which invleves reading the contents of a frame buffer storage location for which new pixel data is being provided, comparing those contents with data representing a display background characteristic or color, and if the result of the comparison is positive, storing the new pixel data in the frame buffer storage location. If the result of the comparison is negative, a selected data value different from the new pixel data is stored in the frame buffer storage location.

8 Claims, 4 Drawing Sheets

MEMORY READ/WRITE CONTROL SYSTEM FOR COLOR GRAPHIC DISPLAY

BACKGROUND OF THE INVENTION

1. Field of the Invention

The present invention relates to color graphic display systems, and more particularly to a read/write control system for a buffer memory for use therein.

2. Background Art

In a conventional graphic display system adapted to display data as processed by a computer, instructions representing image features to be displayed are provided to a display processor which generates data for storage in a buffer having as many cells, or groups of cells, (hereinafter "storage locations") as there are picture elements (pixels) in the display unit. The storage locations store "attribute values", color look-up table addresses corresponding to the color values to be displayed at the corresponding monitor screen location. Such a buffer is frequently referred to as a frame buffer. The frame buffer is scanned in readout at the rate of scanning of the display device. The output is provided to the look-up table, and its output is provided to a digital-to-analog converter, the output of which, in turn, drives the display device itself.

In the absence of additional measures, new instructions to the display processor representing image features to be displayed at screen locations where image features are currently being displayed, result in the supplanting of frame buffer data at the cell locations corresponding to the new feature. In order words, the new image feature is painted over any previous features. This may, in fact, be appropriate for the image sequence being processed. However, in some cases it is desirable to have the new image feature appear to pass under previously existing image features. Alternatively, where a new image feature overlaps a previous image feature it may be desirable to have that area of overlap represented by a third color different from either of the colors of the two intersecting image features. These problems are often referred to in the art as "Underpaint" and "Line-on-Line", respectively.

At slow rates of image update, Line-on-Line and Underpaint have been provided. Current implementations involve software manipulation of the feature data to determine whether those conditions exist, and then generation of appropriate display instructions. However, as a practical matter the provision of a system which provides these capabilities at a sufficient rate to remain compatible with fast-scan large size display screens has heretofore eluded discovery.

Present schemes for Underpaint, for example, require the display processor to logically sort all image features spatially, farthest to nearest, and then send the image feature instructions to the control system for writing pixel information to the frame buffer in accordance with this sort. In other words, Underpaint is really a reverse overpaint effected via software manipulation. Such schemes are typically slow as compared with the scanning rate for the display device, resulting in a noticeable degradation in the smoothness and rapidity of the change of the image features on the display device.

Accordingly, it is desired to provide a color graphic display in which the color changes of portions of the display where image features intersect may be rapidly controlled in a manner which avoids degradation of the displayed image when it is in the process of change.

SUMMARY OF THE INVENTION

The present invention provides, in a computer display system having a frame buffer which stores pixel data for display pixels at corresponding storage locations for each pixel, a method for modifying, in a selectable way, the frame buffer in response to new pixel data for those storage locations. The contents of a frame buffer storage location for which new pixel data is being provided is read and the results of the step of reading are compared with data representing a display background characteristic. If the result of the step of comparing is positive, the new pixel data is stored to the frame buffer storage location for which the new pixel data is provided. However, if the result of the step of comparing is negative, a selected data value, different from the new pixel data, is stored to the frame buffer storage location.

The above steps can be performed repeatedly as necessary to operate on some or all of the storage locations in the frame buffer. The steps can be performed by control circuitry at an extremely rapid rate as compared with prior art schemes for the provision of Line-on-Line and Underpaint. As a result, Line-on-Line and Underpaint can be provided for large fast-scan screens into computer graphic displays.

The foregoing and other objects, features and advantages of the invention will be apparent from the more particular description of the preferred embodiments of the invention, as illustrated in the accompanying drawings and described in the detailed description below.

BRIEF DESCRIPTION OF THE DRAWINGS

In the drawing, like elements are designated with similar reference numbers, and identical elements in different specific embodiments are designed by identical reference numbers.

DETAILED DESCRIPTION OF THE EMBODIMENT

Figure 1:
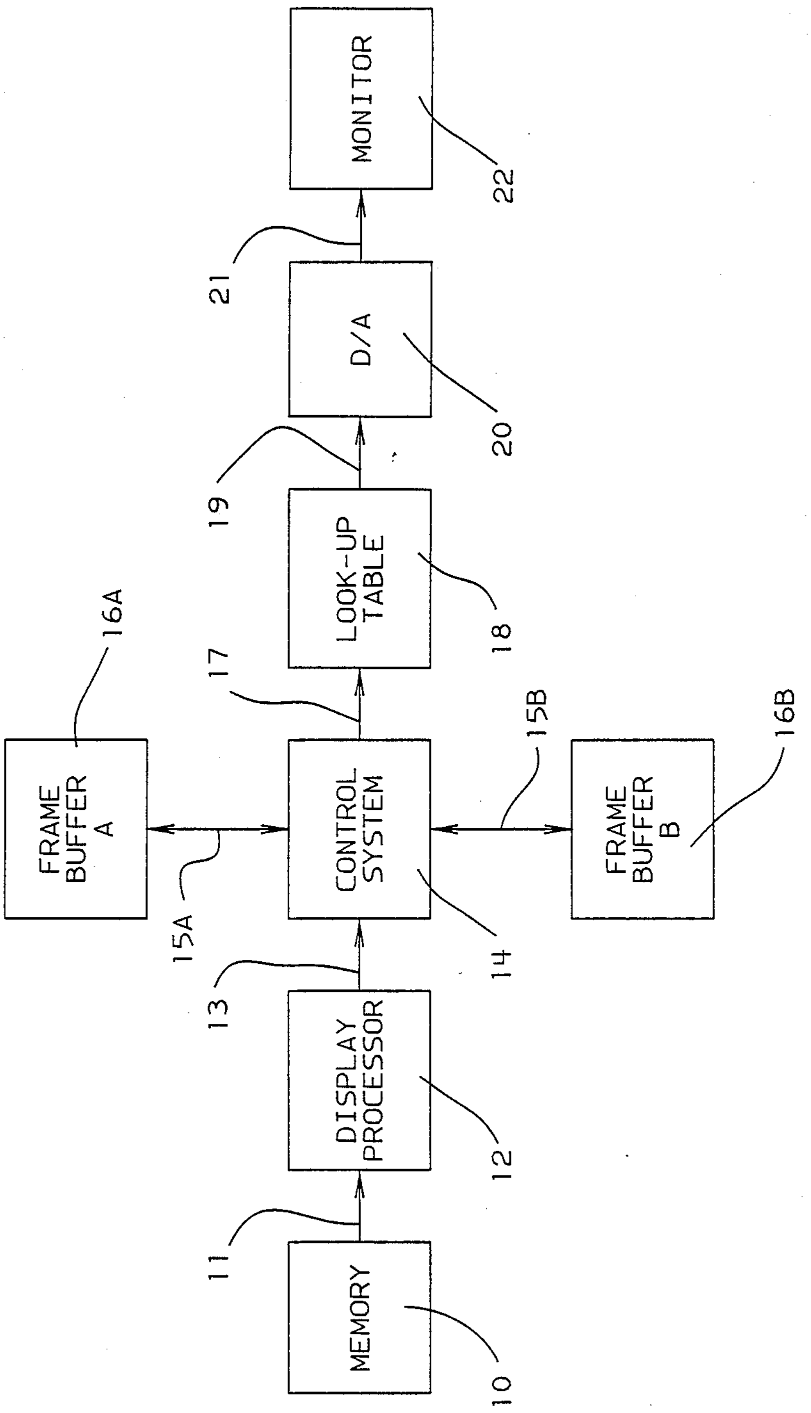
FIG. 1 is a block diagram of a typical display system.

FIG. 1 is a block diagram of a typical color display system adapted to display data in accordance with instructions generated by a computer (not shown). The computer, in conjunction with the generation of graphic image features, generates a set of instructions which it stores in a memory 10. These instructions are provided in appropriate sequence on line 11 to a display processor 12 which interprets the instructions and provides attribute data, in the form of color look-up table addresses, and pixel storage location address data on line 13 to a control system 14. The control system 14 controls the writing of the attribute data to the specified pixel storage locations in a dual frame buffer 16A, 16B, and the reading of that data, via lines 15A and 15B. Each buffer (16A, 16B) has eight bit planes so that each storage location can store an eight bit byte. In read-out to the monitor, the attribute data is read out from frame buffer 16A (or 16B) address locations in raster scan fashion and provided on line 17 to a look-up table 18. Both the reading to and writing from the two parts (16A, 16B) of the buffer are done in a ping-pong process. The attribute data on line 17 is used as addresses for locations in look-up table 18. Raw digital video data is read out from those locations and provided on line 19 to a digital-to-analog converter 20. Analog video is provided on line 21 to a monitor 22. These elements of a color graphic display system are, in general, known. An example of such a color graphic display system is the IBM Model 5080 Model 1. A more detailed description of this system can be found in the following publications: (1) "IBM 5080 Graphics System Operations Manual", Form No. GA23-2005-0; (2) "IBM 5080 Graphics System Principles of Operation", Form No. GA23-0134-0; both available from IBM Corporation.

Figure 2:
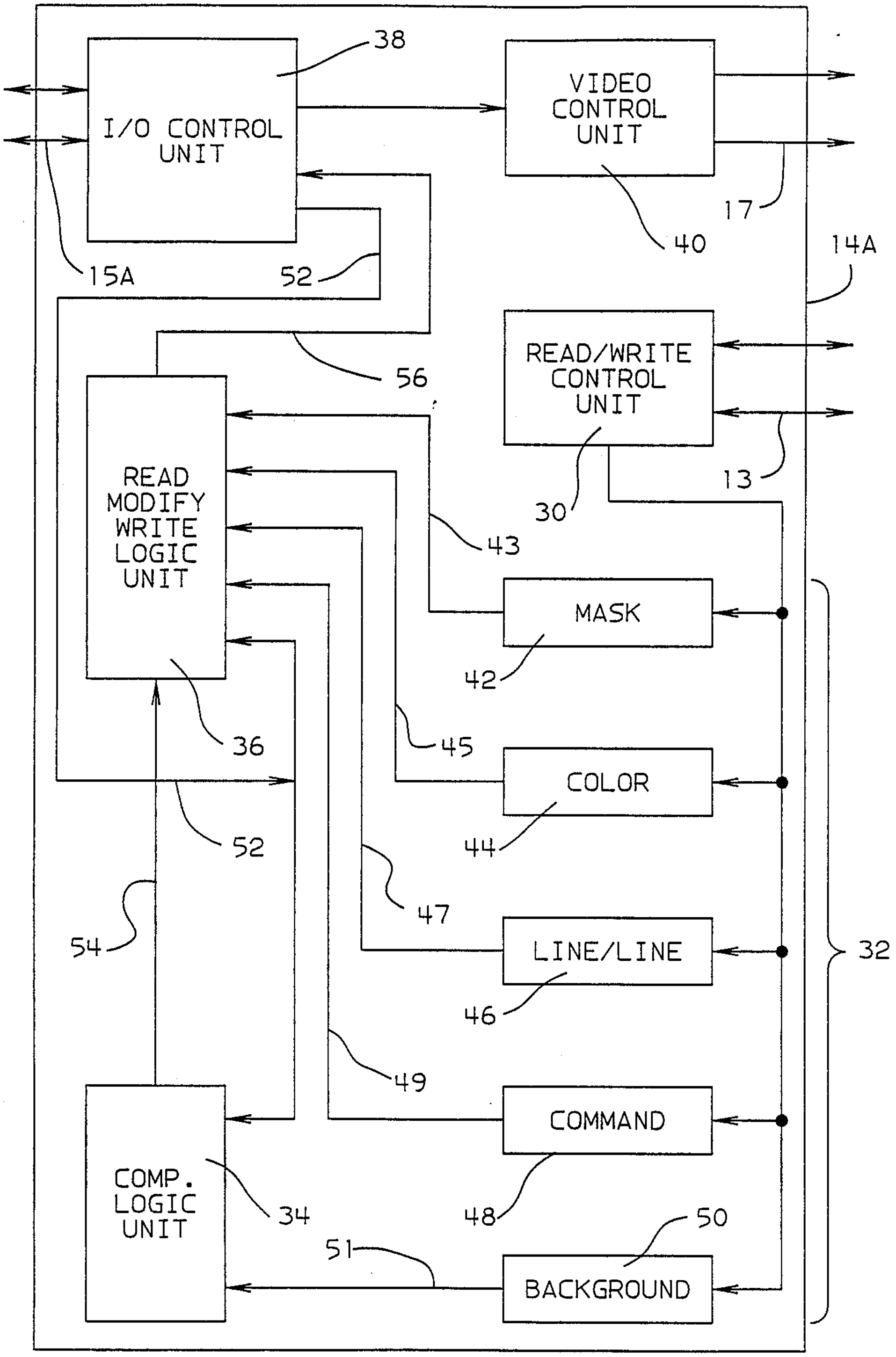
FIG. 2 is a more detailed diagram of a portion of such a system depicted in FIG. 1, including the preferred embodiment of the present invention.

FIG. 2 is a diagram of a subsystem 14A of control system (FIG. 1) 14 embodying the preferred embodiment of the present invention. Subsystem 14A operates in conjunction with part 16A of frame buffer 16. Another control subsystem (not shown), substantially identical to part subsystem 14A is provided to operate in conjunction with part 16B of frame buffer 16. If frame buffer parts 16A and 16B were further subdivided, for example for increased efficiency in the reading and writing of data, then it might be desired to have one control subsystem like 14A for each such subdivision. Together, all such subsystems comprise control system 14 (FIG. 1).

Subsystem 14A includes a Read/Write Control unit 30, a set 32 of eight bit wide registers, a Comparator Logic Unit 34, a Read/Modify/Write Logic Unit 36, an I/O Control Unit 38 and a Video Control Unit 40, all as shown. The registers in set 32 are Mask Register 42, Color Register 44, Line-on-Line Register 46, Command Register 48 and Background Register 50. Color Register 44 stores color attribute data; Background Register 50 stores background color attribute data; and Line-on-Line Register 46 stores Line-on-Line color attribute data.

The preferred embodiment of the invention is realized in subsystem 14A through a Read/Modify/Write implementation. Broadly, Read/Modify/Write implemented as follows. Data is provided to subsystem 14A from the display processor 12 (FIG. 1) for the generation of a graphic image feature, such as a line. This data comprises color data for the line, background color data for the region of the monitor screen in which the line is to appear and, sequentially, the pixel storage location addresses corresponding to the new feature. The color data is stored in Color Register 44 and the background color data is stored in Background Register 50.

Additionally, Line-on-Line color data is stored initially under operator control in Line-on-Line Register 46 for regions where a Line-on-Line condition is found to exist. For example, the operator may decide that where a Line-on-Line condition exists, it is desirable to have that region highlighted by assigning that region the color yellow. The operator would then store the attribute data corresponding to the color yellow in Register 46. If the overlapping graphic figures were red and blue, the color yellow would stand out immediately and provide the desired notification to the viewer on the computer display of the Line-on-Line condition.

As the pixel storage location address data is provided to subsystem 14A, the contents of that storage location in either buffer 16A or 16B (FIG. 1), depending upon on which is the next frame to be displayed, are read from the buffer 16 and written to a storage location in subsystem 14A. There, it is compared with the contents of Background Register 50.

If the result of the comparison is positive (a match occurs), the contents of Color Register 44 are written into the storage location from which the pixel data was just read. This corresponds to the situation where the new graphic feature overlaps no previous feature, i.e., what was on the screen before was background, rather than some portion of a graphic figure previously displayed. In that case, it is clearly not a Line-on-Line or Underpaint situation, and so the appropriate action is the writing of the new color information to that storage location.

On the other hand, if the result of the comparison is negative (not a match), then, depending upon whether a Line-on-Line operation or an Underpaint operation has been selected, either of the following is performed.

1. (Line-on-Line) The contents of Line-on-Line Register 46 is written into the storage location.

2. (Underpaint) The contents of the storage location previously read out of the storage location and used for comparison are read back into the storage location (the storage location remains unchanged).

Thus, in the Line-on-Line situation the area of overlap is highlighted with the color corresponding to the attribute data stored in line-on-Line Register 46, while in the Underpaint situation, the storage location remains unchanged, corresponding to the covering of the new graphic feature by a previously existing graphic feature.

In more detail, subsystem 14A operates as follows. A control word is provided on line 13 from the display processor 12 (FIG. 1) which is received by Read/Write Control Unit 30. This control word informs Unit 30 of the pending transmission of data words to be stored in each of the registers in set 32. The data words are then provided on line 13 and are routed to registers 42–50 under the control of Unit 30. Command Register 48 uses six of its eight bits for the selection of one or more of the following functions: AND, OR, XOR, INVERT, Line-on-Line and Underpaint. (The other two bits are not used.) The first four functions are conventional Boolean operations. Where such Boolean operation requires two inputs, the inputs are the byte of data being read from the frame buffer (the "pixel byte") and the contents of Color Register 44 (the "color byte"). Otherwise (INVERT, or the default NO MODIFICATION), the operation is only on the pixel byte. The bit values of Command Register 48 are provided to Read/Modify/-Write Logic Unit 36 on six bit wide line 49.

As mentioned above, Color Register 44 stores the color byte, a byte representing the color attribute of a graphics feature to be written to the frame buffer. Recall that an attribute value is actually an address for a location in look-up table 18 (FIG. 1) that contains the particular color value. Background Register 50 stores the background byte, an attribute byte representing the background color in the region of the aforementioned graphic image feature.

Mask Register 42 is a register having one bit position assigned to each of the eight bit planes in the frame buffer. If the bit value for a given plane in mask register 42 is "0", no mask is indicated for that plane; conversely if it is a "1" that bit plane is masked. This information is provided to the Read/Modify/Write Logic Unit 36 on eight bit wide line 43. Line-on-Line Register 46 stores the Line-on-Line byte, an attribute byte for Line-on-Line situations.

Video Control Unit 40 acts as a serializer to provide pixel bytes to Look-up Table 18 (FIG. 1) serialized and correctly timed for raster scan of monitor 22 (FIG. 1). I/O Control Unit 38 controls the reading and writing of data read from and to Frame Buffer 16A (FIG. 1) via line 15A, and the transmission of data from Frame Buffer 16A to Comparator Logic Unit 34, Read/-Modify/Write Logic Unit 36, and Video Control Unit 40.

Figure 3:
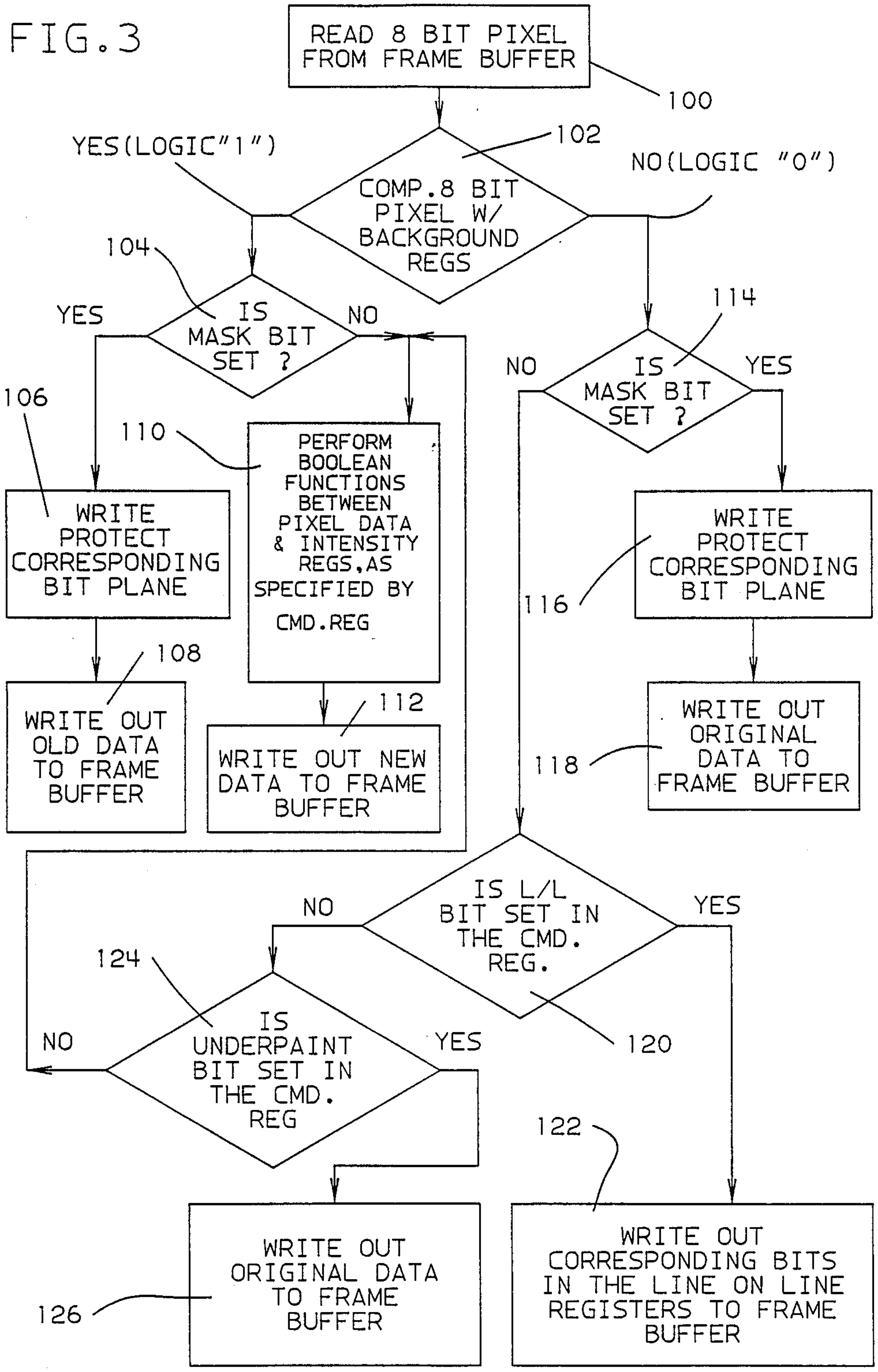
FIG. 3 is a flow chart showing the operation of the preferred embodiment of the present invention.

Referring now to FIG. 3 (in conjunction with FIGS. 1 and 2), the first step 100 in the Read/Modify/Write operation is the reading of the eight bit pixel byte from Frame Buffer 16A (FIG. 1). This reading is performed under the control of I/O Control Unit 38 (FIG. 2), and results in the pixel byte being temporarily buffered in eight latches within unit 38. It is there made available on line 52 which provides the data to Units 34 and 36.

In the next step 102, the pixel byte on line 52 is compared with the background byte on line 51. This is done in Comparator Logic Unit 34 (FIG. 2). Following the left-hand branch of step 102, if the result of the compare operation in step 102 is positive (the bytes are identical), a logic "1" appears on line 54 (FIG. 2), and the next step 104 is performed.

Note that step 104 and the subsequent steps in this branch of the flow chart represent operations on one BIT at a time, while steps 100 and 102 involve operations on one or more BYTES. All operations in the flow chart other than steps 100 and 102 represent operations on single bits within bytes. These single bit operations are performed in parallel for each of the eight bits in the pixel byte.

Returning to step 104, for the particular bit in the pixel byte being processed it is determined whether the mask bit for the bit plane represented by that bit position is set. If it is, then step 106 is performed, which is to write protect the corresponding bit plane. Then, in step 108, the latched data bit (of the pixel byte) appearing on line 52 (FIG. 2) for that bit plane is written back to Frame Buffer 16A (FIG. 1) to restore to the storage location its original contents. Thus, masking is effectively implemented for that bit plane in the processing of the pixel byte.

Returning to step 104, if the mask bit is determined not to be set, step 110 is performed which is the performing of Boolean functions between each of the corresponding bits of the pixel byte and the color byte, as specified by bit values in Command Register 26 (FIG. 2), as mentioned above. Then, in step 112 the new data (the color byte) is written to Frame Buffer 16A (FIG. 2) at the storage location being processed.

If, in step 102 the compare operation results in a negative determination (the pixel byte and the background byte are not equal), a logic "0" appears on line 54 (FIG. 2), and step 114 is performed. In step 114, again it is determined whether the mask bit is set for that bit plane. If it is, steps 116 and 118 are performed, which are identical to steps 106 and 108, respectively, described above.

If the result of the operation performed in step 114 is negative (mask bit not set), step 120 is performed. In step 120 it is determined whether the line-on-Line bit is set in Command Register 48 (FIG. 2). If it is, then step 122 is performed in which the bit of Line-on-Line byte stored in Line-on-Line Register 48 (FIG. 2) is written to Frame Buffer 16A (FIG. 1).

If in step 120 it is determined that the Line-on-Line bit is not set in Command Register 48 (FIG. 2), then step 124 is performed. In step 124 it is determined whether the Underpaint bit is set in the command register 48 (FIG. 2). If it is not, then steps 110 and 112 are performed as described above, and the hit of new data (from the color byte) is written to the pixel storage cell location, with any specified Boolean operations performed on it.

If the result of step 124 is positive, i.e., the Underpaint bit is set, then step 126 is performed. In step 126 the original data bit (of the pixel byte) latched on line 52 (FIG. 2) is written back to the pixel storage location in Frame Buffer 16A (FIG. 1) from which it was read.

Figure 4:
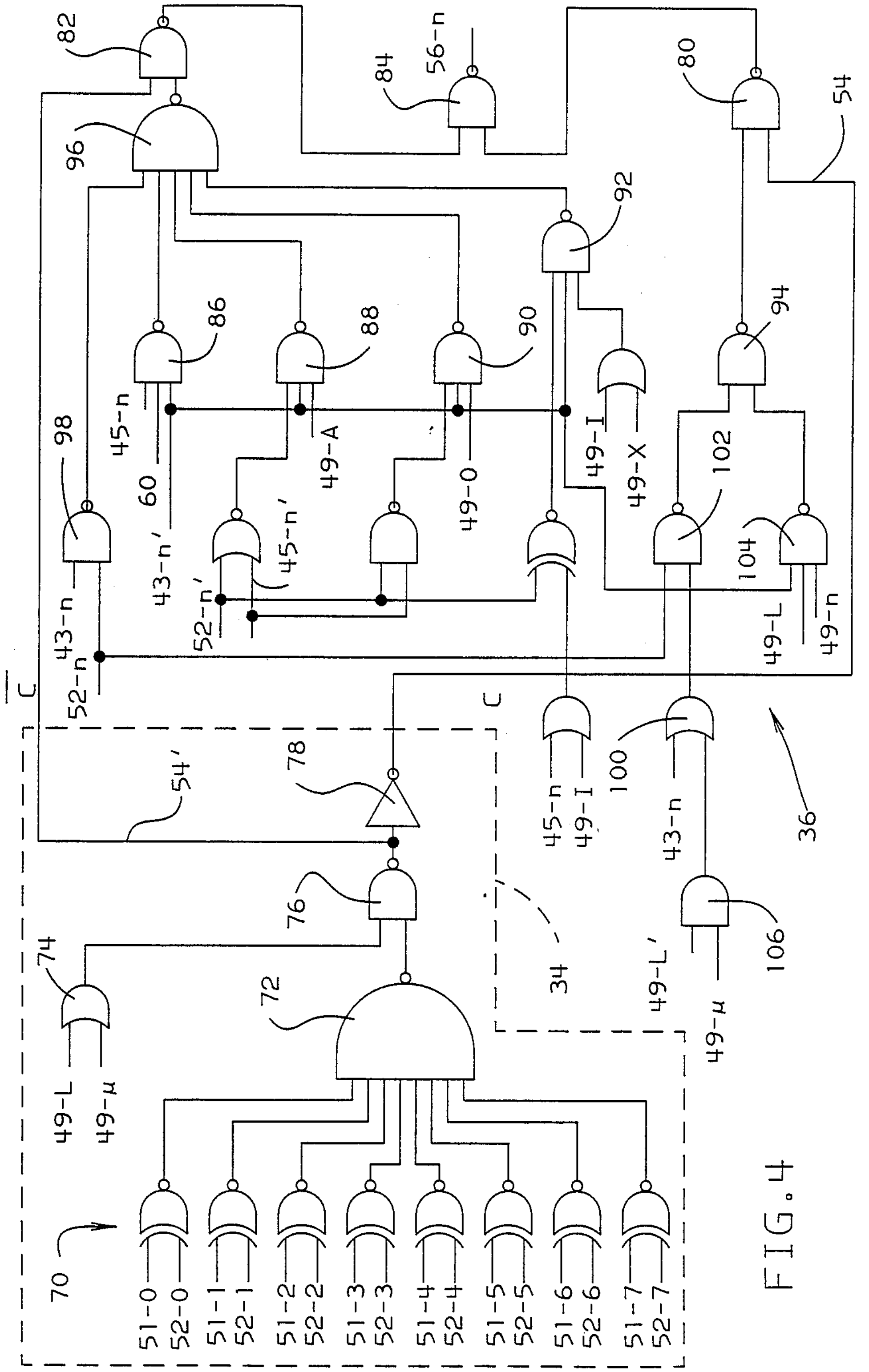
FIG. 4 is a circuit diagram of the Read/Modify/-Write Logic Unit and Comparator Logic Unit of FIG. 2.

FIG. 4 is a logic circuit diagram of Read/Modify/-Write logic unit 36 and Comparator Logic Unit 34 of FIG. 2. In FIG. 4, bit lines which are single bit lines within eight bit byte lines are referenced with a hyphened character. The first number in the hyphened character is the reference number for the eight bit byte line. The second number (or letter), appearing after the hyphen, represents either the position of the bit in the byte or the functional significance of the byte line. For example, lines 51 and 52 appear at the far left hand side of FIG. 4. Thus, bit positions 0 through 7 for each byte line (51-0 through 51-7 and 52-0 through 52-7), representing all eight bit positions for each byte, are shown. Line 49, however, is the eight bit line providing the bit contents of Command Register 48 (FIG. 2), and in FIG. 4 a letter designation has been provided after the hyphen indicating its functional significance instead of its sequential position within Command Register 48. Thus, 49-L is the Line-on-Line bit line, 49-U is the Underpaint command bit line, 49-A is the Boolean AND bit line, 49-O is the Boolean OR bit line, 49-I is the INVERT Boolean bit line, and 49-X is the Boolean EXCLUSIVE OR bit line.

Bit line 60 is a line which is a logic "1" if no commands have been selected, i.e., all bit positions in Command Register 48 (FIG. 2) are "0".

For all reference characters in FIG. 4, a primed reference character indicates a logical NOT with respect to the reference number being primed. Thus, line 49-L' is the logical inverse, or complement, of the Line-on-Line command bit value.

Finally, a letter "n" after the hyphen indicates a general bit position of the byte line being referenced. Thus, reference 52-n indicates the nth bit of the byte on line 52. The circuit for Logic Unit circuit 36 shown in FIG. 4 is repeated eight times for simultaneous parallel operations on each of the eight bit positions, so that an entire byte of data may be processed at once. Thus, the "n" refers to the general bit position for that circuit.

The operation of the circuit shown in FIG. 4 is as follows. Lines 51 and 52 are EXCLUSIVE NORed in array 70, and the outputs of array 70 are provided to the input of NAND gate 72. The output of NAND gate 72 is provided, along with the output of OR gate 74 to the inputs of a further NAND gate 76. The output line 54' of NAND gate 76 carries the inverse of the result of the comparator operation. Line 54' is applied to inverter 78, the output 54 of which carries the result of the comparator operation.

Lines 49-L and 49-U, applied to OR gate 74 are the Line-on-Line and Underpaint Command bit positions, respectively. Thus, if either Line-on-Line or Underpaint is selected, the output of Comparator 34 is made available. Otherwise, it is suppressed.

The mask bit 43-N, and its compliment 43-N′, affect operation as follows. A mask bit value of "1" is applied on line 43-N to OR gate 100, forcing its output to a logic "1" value. This enables NAND gate 102 to pass the pixel byte bit value of line 52-N, inverted, through NAND gate 102 to the input of NAND gate 94. Line 43-N′, being logic "0", forces the output of NAND gate 104 to be logic "1", thus enabling NAND gate 94. The doubly inverted pixel byte bit value is thus provided to one input of NAND gate 80. Provided the other input of NAND gate 80, line 54, is logic "1", the output is provided to the input of NAND gate 84.

Additionally, a mask bit value of "1" is applied on line 33-N to NAND gate 98, enabling it to pass the pixel byte bit value of line 52-N to one input of NAND gate 96. The compliment mask bit value of "0" is applied on line 43-N′ to NAND gates 86, 88, 90 and 92, thus forcing the outputs of each of those NAND gates to a logic "1" allowing the bit value appearing at the output of NAND gate 98 to pass through NAND gate 96. The output of NAND gate 96 is applied to the input of NAND gate 82, where it is passed to the input of NAND gate 84 if the value of line 54′ is a "1+. Since lines 54 and 54′ are logically the inverse of one another, it can be seen that when the mask bit value is a "1", the pixel byte bit value is passed to the output of NAND gate 84 to line 56-N, either through NAND gate 80 or NAND gate 82 depending on the condition at the input of NAND gate 76. In either case, the original pixel byte bit is provided as an output of Read/Modify/Write Logic Unit 36 for writing back to the frame buffer.

In the absence of the mask bit being set to logic "1", if line 54 is logic 1, indicating the selection of either or both of Line-on-Line and Underpaint, and no logical match between the background byte and the pixel byte, the circuit operates as follows. If Underpaint is selected, and Line-on-Line is not selected, requiring the writing back of the same pixel byte bit value to Frame Buffer 16A (FIG. 1), AND gate 106 is forced to have an output of "1". The output of OR gate 100 is thus "1", enabling NAND gate 102 to pass the bit of pixel byte to one input of NAND gate 94. Since it is specified that Line-on-Line is not selected, line 49-L has a value of logical "0", and the output of NAND gate 104 is thus logical "1", thus enabling NAND gate 94. Since no logical match occurs between the background byte and the pixel byte, the output of NAND gate 72 is forced high, and since Underpaint is selected line 49-U is logical "1", line 54 is logical "1", enabling NAND gate 80 to pass the data appearing on the output of NAND date 94.

If a logical match occurs between the background byte and the pixel byte, line 54 will have a logical "0" and line 54′ will have a logical "1". In that case, the Line-on-Line (or Underpaint) condition does not exist, and the new color byte is to be written to line 56-N. This condition will also exist if neither line 49-U nor line 49-L is selected, indicating that neither Line-on-Line nor Underpaint has been selected. In any of those cases, the circuit operates as follows. It is assumed that the mask bit is not set, therefore NAND gate 98 is disabled setting its output high. Likewise, line 43-N′ is high, providing a high input to each of the respective inputs to NAND gates 86-92. Depending upon the selection of Boolean operations one of the lines 49-A, O, I, etc., will be logical "1", enabling the appropriate combination of gates tied to NAND gates 86-92 to effect the appropriate Boolean operation and pass the results to the input of NAND gate 96, the other gates enabling the passage through NAND gate 96 of that data to NAND gate 82.

The above described comparison and storage operations can be made at an extremely rapid rate, thus permitting the utilization of these enhancements to a graphic display system in conjunction with a rapid scan, large size (1 meg pixel) display screen.

Thus, while the invention has been described with reference to the preferred embodiment, it will be understood by those skilled in the art that various changes in the form and details may be made without departing from the scope of the invention.

We claim:

1. In a computer display system having a frame buffer which stores pixel data for display pixels at corresponding storage locations for each pixel, said pixel data indicating a color or shade of gray to be displayed, a method for selectively modifying one or more storage locations in the frame buffer with new pixel data for those storage locations in response to a modification command, the method comprising the steps of:

reading the contents of a frame buffer storage location for which new pixel data is provided;

comparing the results of said step of reading with data representing a display background characteristic;

if the result of said step of comparing is positive, storing said new pixel data in said frame buffer storage location; and if the result of said step of comparing is negative, determining a data value to store in response to said modification command; and storing said data value in said storage location.

2. The method of claim 1 wherein said step of determining a modified data value to store comprises the steps of:

testing said modification command;

if said modification command requires "underpaint" then generating said modified data value equal to the contents of said frame buffer storage location obtained in said reading step;

if said modification command requires "line-on-line" then generating said modified data value equal to a line-on-line data value;

if said modification command requires a logical combination of said new pixel data and said contents of said storage location obtained in said reading step, then generating said modified data value as equal to a logical combination of said new pixel data and said contents of said storage location obtained in said reading step.

3. In a computer display system having a frame buffer which stores pixel data for display pixels at corresponding storage locations for each pixel, a method for modifying, in a selectable way, the frame buffer in response to new pixel data for those storage locations, comprising the steps of:

providing control circuitry connected to receive the new pixel data and to control the reading from and writing to storage locations in the frame buffer;

providing for one or more frame buffer storage locations, new pixel data to said control circuitry relating to a graphic feature to be displayed, including feature color data and background color data;

storing said feature color data in a first storage location associated with said control circuitry;

storing said background color data in a second storage location associated with said control circuitry;

comparing the contents of said second storage location with the contents of one of said one or more frame buffer pixel storage locations;

if the result of said step of comparing is positive, storing a first predetermined data value in said one of said storage locations;

if the result of said step of comparing is negative, storing a second predetermined data value in said one of said storage locations; and repeating the immediately previous three steps for the remainder of said one or more frame buffer pixel storage locations.

4. A method according to claim 3 wherein said step of storing a first predetermined data value comprises the step of storing said new pixel data in said one of said storage locations.

5. A method according to claim 3 wherein said step of storing a second predetermined data value comprises the step of storing a preselected data value different from either said background data or said new pixel data.

6. A memory control system for selectably modifying pixel data with new pixel data in response to a modification command, the pixel data being stored in a frame buffer at storage locations corresponding to display pixels, said pixel data indicating a color or shade of gray to be displayed, the system comprising:

means for reading the data contents of a storage location for which new pixel data is provided;

means for comparing the data contents read by said means for reading with data representing a display background characteristic, wherein said means for comparing generates a compare signal;

means responsive to said means for comparing and to said modification command for storing in said storage location, said means comprising:

means for generating modified data equal to new pixel data when said compare signal is positive;

means for generating modified data equal to said data contents read by said means for reading when said compare signal is negative and said modification command is "Underpaint";

means for generating modified data equal to a line-on-line data value when said compare signal is negative and said modification command is "line-on-line";

means for generating modified data equal to a logical combination of said new pixel data and said data contents read by said means for reading when said modification command indicates a logical combination; and means for storing said modified data in said storage location.

7. A method for drawing a line in a graphics display system, wherein said line is represented by pixel data indicating a color or shade of gray to be displayed, and wherein said pixel data representing said line and pixel data representing pre-existing lines are stored in storage locations of a frame buffer having a storage location for each display pixel, said method comprising the steps of:

establishing a line-on-line pixel value;

generating new pixel data and storage location data for said line;

determining for each new pixel data storage location whether pixel data representing a pre-existing line is stored in said storage location;

storing said new pixel data in said storage location if no pixel data representing a pre-existing line is stored; or storing said line-on-line pixel value in said storage location if pixel data representing a pre-existing line is stored.

8. A method for drawing a line in a graphics display system so that said line appears under any displayed pre-existing lines, wherein said line and pre-existing lines are represented by pixel data indicating a color or shade of gray to be displayed, said pixel data being stored in storage locations in a frame buffer having a storage location for each display pixel, said method comprising the steps of:

setting said display system to an underpaint condition;

generating new pixel data and storage location data for said line;

determining for each new pixel data storage location of said line whether pixel data from a pre-existing line is stored in said storage location;

storing said new pixel data in said storage location if no pixel data from a pre-existing line is stored; or leaving said storage location unchanged, if pre-existing line pixel data exists.

* * * * *